May 26, 1959 W. E. STOCKMAN 2,888,526

PEAK AND NOTCH FILTERS INCLUDING ACTIVE ELEMENTS

Filed Sept. 24, 1956 2 Sheets-Sheet 1

INVENTOR.
WILLIAM E. STOCKMAN
BY Harry R. Lubcke
AGENT

May 26, 1959 W. E. STOCKMAN 2,888,526
PEAK AND NOTCH FILTERS INCLUDING ACTIVE ELEMENTS
Filed Sept. 24, 1956 2 Sheets-Sheet 2

INVENTOR.
WILLIAM E. STOCKMAN
BY Harry R. Lubcke
AGENT

United States Patent Office 2,888,526

Patented May 26, 1959

2,888,526

PEAK AND NOTCH FILTERS INCLUDING ACTIVE ELEMENTS

William E. Stockman, Greenwich, Conn., assignor to Ling Electronics, Inc., Los Angeles, Calif., a corporation of California Application September 24, 1956, Serial No. 611,628

11 Claims. (Cl. 179—171)

My invention relates to electrical filters and particularly to an electrical filter employing active elements and feedback circuits capable of giving a sharper change in amplitude as a function of frequency than a resonant circuit alone, with, alternately, a rise or a fall in the amplitude at a selectable frequency.

Improvement in performance of circuits is constantly sought after in the electronics arts. Either a practical or an absolute limit is reached in this search because of the limitation of circuit elements. By combining such elements in a simple amplifier structure and by applying positive feedback I am able to improve the performance of an inductor-capacitor resonant circuit, for instance, far beyond that inherent in the elements. By also applying negative feedback I am able to stabilize the system. By employing this structure per se I am able to place a "peak" in the amplitude vs. frequency characteristic thereof. By inserting this structure in the negative feedback path of a second amplifier I am able to place a "notch" in the amplitude vs. frequency characteristic of this second amplifier.

Such a versatile filter finds many applications in the electronic arts. A principal application lies in the field of electronically produced vibration for testing purposes. The vibration apparatus is of the nature of an electrodynamic loudspeaker of large size and thus often has sharp resonances in the frequency characteristic. In fact, the resonances of vibration apparatus are ordinarily much sharper than those of a loudspeaker. These resonances may be either peaks or notches. Not only may these occur within the vibration system itself but also because of the fastening fixtures or other auxiliaries. In order that the characteristic of amplitude of vibration-producing electrical energy vs. frequency be a uniform function, it is necessary to insert a filter notch to reduce system sensitivity at each peak and a filter peak to increase system sensitivity at each notch. Since there are usually several such resonances several of my filters are required, one being used for each peak or notch. It is usual that both peaks and notches occur in any one set-up, thus my alternate peak or notch functioning of each filter is highly desirable.

There are numerous other applications for my filters, such as to provide a sharp response in a frequency spectrum for recovering coded signals at a particular frequency. This is accomplished by utilizing the peak connection. Conversely, to remove an interfering frequency from a spectrum while preserving as much of the spectrum as possible a notch connection is used. For obtaining multiple narrow communication channels closely related in frequency, a number of my units may be employed with particular effect. This is because of the increased sharpness of response which I achieve by increasing the effective inductive reactance to resistance ratio of a tuned circuit, i.e., that which is often termed the "Q" of the circuit.

Still further uses include that of replacing a quartz crystal filter where a variable resonance frequency is required, and for filtering out harmonics in laboratory bridge measurements and the like.

While I shall describe a particular embodiment operative in the sub-audio and audio frequency ranges, my filter is equally well operative in the supersonic and even radio frequency spectrums by merely utilizing smaller values of inductance and capacitance and by avoiding stray capacitances.

An object of my invention is to obtain much greater than inherent electrical performance from resonant-circuit elements.

Another object is to provide an electrical filter improved by positive feedback and stabilized by negative feedback between active elements associated therewith.

Another object is to provide a filter giving a sharp peak at a selected frequency in the frequency vs. amplitude characteristic thereof.

Another object is to provide a filter giving a sharp notch at a selected frequency in the frequency vs. amplitude characteristic thereof by utilizing the elements of the peak filter in combination with further similar elements.

Another object is to provide a peak or notch filter in which the height or depth, respectively, and the sharpness of either may easily be varied by an operator.

Another object is to provide a peak and notch filter that is relatively small, simple and inexpensive in view of the order of performance thereof.

Other objects of my invention will become apparent upon reading the following detailed specification and upon examining the related drawings, in which.

Figure 1:
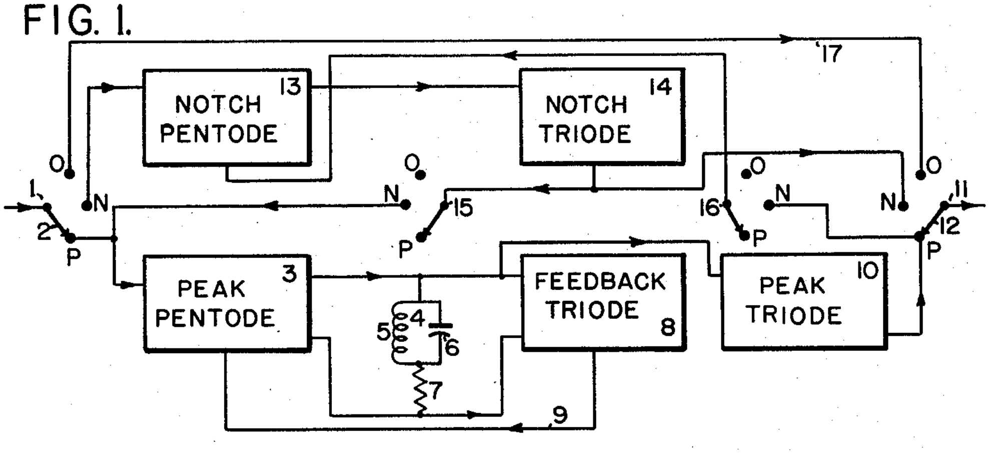
Fig. 1 is a block diagram of my peak and notch filter.

In Fig. 1, numeral 1 represents a three-position switch connected to the input of my filter. When the switch arm 2 makes contact to contact P as shown, the filter is adapted to insert a peak in the frequency response at a selectable frequency. Following through this portion of the device the incoming signal is amplified by peak pentode 3, having a high plate load resistance and therefore acting as a constant-current source, and from there impressed upon parallel-resonant circuit 4, composed of inductor 5 and capacitor 6. Resistor 7 allows a fixed nominal signal amplitude to be produced at frequencies other than those of the peak region, as will be clear from the complete circuit of Fig. 3 to be discussed later. The response of the resonant circuit is impressed upon feedback triode 8, which is of the cathode-follower type. The unbypassed cathode resistor of this triode provides negative or stabilizing feedback, while a portion thereof from the arm of a potentiometer to signal ground forms an impedance across which a portion of the signal is fed back to the cathode of peak pentode 3. This constitutes positive or regenerative feedback and is conveyed by conductor 9. In the peak pentode amplifier stage 3 stabilizing negative feedback is produced mainly by a large unbypassed cathode resistor.

The response of the resonant circuit, together with that due to resistor 7, is also impressed upon peak triode 10. This is also of the cathode-follower type and provides the peak output through switch 11, the switch arm 12 thereof being shown in position P.

When a notch in the amplitude vs. frequency characteristic is required, the several switches shown are set to the N contacts. The four switches shown may be operated in a ganged fashion.

When switch 1 is connected to contact N, the input goes exclusively to the notch pentode 13. The plate output is direct-coupled to notch triode 14 of the cathode-follower type. Switch 15 is connected to the cathode of notch triode 14 and when in the N position feeds the signal therefrom to the input of peak pentode 3. The signal then passes through resonant circuit 4 with resistor 7, feedback triode 8 and peak triode 10, whence via switch 16 in the N position the output of the peak portion of my device is impressed upon the cathode of notch pentode 13. This completes the feedback path from notch triode 14 to notch pentode 13. This path is from cathode to cathode of the tubes involved but because peak pentode 3 reverses the phase of the signal, while cathode-follower peak triode does not, the feedback is out of phase and is thus negative or degenerative.

When the several switches, notably 1 and 11, are in the O position the filter is "out" of circuit, i.e., the input and output terminals are connected together by conductor 17. Arrows on signal-carrying conductors show the direction of signal flow in both Figs. 1 and 3.

Figure 3:
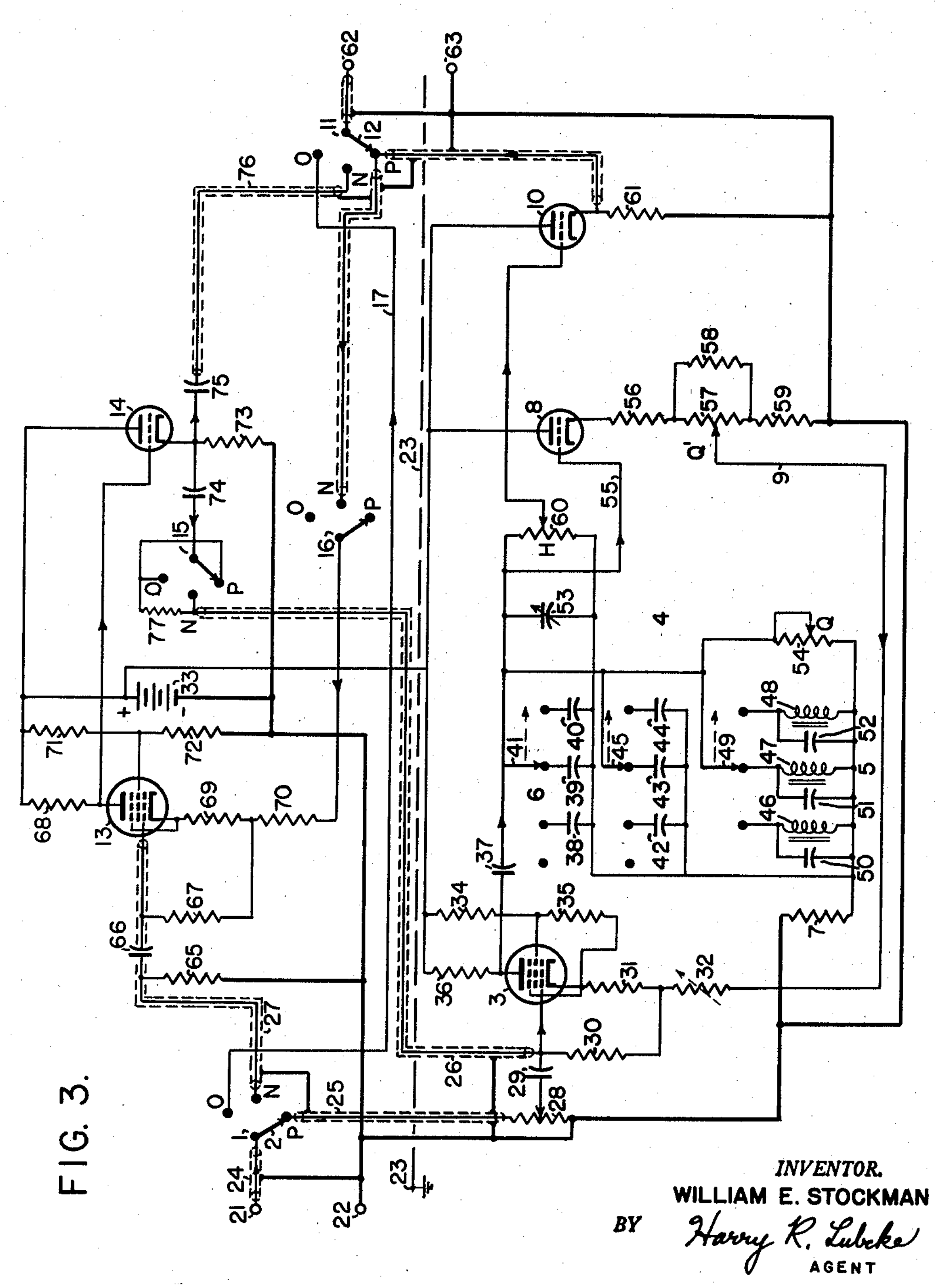
Fig. 3 is the schematic diagram of my peak and notch filter.

Passing now to the detailed circuit of Fig. 3, terminal 21 is the high signal-input terminal and terminals 22 is the signal-ground terminal for the filter, the latter which may or may not be conductively connected to ground depending upon whether or not any direct potentials are required to be carried by the filter as a whole. An electrostatic shield 23 separates the peak from the notch portions of my filter. Sensitive, that is, high-impedance signal leads are also shielded, as shown at 24, 25, 26, 27, etc. These shields are connected to the signal ground 22. This shielding provides a high degree of performance, such as minus 55 db for a notch.

Tracing the signal through the peak portion of the filter in Fig. 3, it enters at terminal 21, passes through switch 1 via arm 2 and contact P to potentiometer 28. The latter is a gain adjustment for the "fixed" nominal signal level, usually a back-of-panel service adjustment. The signal next passes through coupling capacitor 29, over grid-return resistor 30 and to the control grid of peak pentode 3. The grid-bias resistor 31 in the cathode circuit of pentode 3 is unbypassed and thus provides negative feedback for that tube, as does particularly resistor 32, usually of larger value. Suitable voltage for the screen-grid of pentode 3 is obtained from the plate-voltage supply, battery 33, by a purely resistive voltage divider 34, 35, while the suppressor-grid is connected to the cathode. Preferably the pentode has a metal shield (not shown) and this is connected to the same ground as shield 23.

Plate load resistor 36 has a high value, of the order of a half-megohm, so that peak pentode 3 acts essentially as a constant-current source to the parallel-resonant circuit 4 and resistor 7. This also avoids damping the resonant circuit. Capacitor 37 is for coupling. Capacitors 38, 39 and 40 are selectable by switch 41 to provide the capacitive reactance for certain portions of the frequency range of the filter, each usually having a different capacitance value and in this group being of the mica type. Capacitors 42, 43 and 44 are similarly selectable by switch 45 and are usually of larger values than the former group. Inductors 46, 47 and 48 are selectable by switch 49 and usually have different inductance values, one from the other, by a factor of ten. These may be relatively high-Q toroid coils with cores of magnetic material and encapsulated for stability. Capacitors 50, 51 and 52 limit the high-frequency range of each inductor to a suitable L/C ratio. Variable capacitor 53 is normally an air capacitor sufficiently large to give all incremental capacitance values between the smallest increments obtainable by switching between capacitors 38, 39, 40. It will be understood that the capacitors, switches, inductors and variable capacitor can be proportioned to give resonance at any frequency in a given spectrum, as the audio frequency spectrum; but if this is not desired a single inductor and capacitor may be employed as the simplest arrangement of this part of the circuit.

Variable resistor 54 has a value in the megohm range and is in direct shunt to the parallel resonant circuit 4. At full resistance value it has negligible shunting effect upon the resonant circuit. When at a small resistance value it heavily shunts the resonant circuit, greatly reducing the ratio of inductive reactance to effective resistance thereof. As such it is known as the "Q" control and is preferably arranged with a logarithmic variation of resistance with arm rotation.

The full signal output of the resonant circuit is impressed via conductor 55 upon the grid of feedback triode 8. This tube is cathode-follower connected. Resistor 56 has a value of the order of several hundred ohms in a typical embodiment and limits the amount of positive feedback obtainable. Potentiometer 57 is of the same order of resistance value and is shunted with a fixed resistor 58 of somewhat higher value to give exactly the desired range of feedback-voltage variation. Resistor 59 is of relatively small resistance value and sets a minimum value for positive feedback.

Regeneration, or in-phase feedback of signal energy, has the important effect of reducing the apparent effective series resistance of parallel resonant circuit 4. This increases the ratio of inductive reactance to resistance thereof by reducing the resistance. Since that ratio is "Q," the sharpness of the resonant circuit is increased far above the inherent value of the elements and one of the objects of my invention is realized. I have given this control the designation of Q′, or "Q booster" for identification.

Degeneration, or phase-opposition feedback of signal energy, has the important effect of stabilizing the gain of the amplifier. The gain becomes substantially independent of variations in vacuum tube electrode voltages due to power line voltage variations, of variations due to operating temperature and due to aging of the tubes. The overall gain of the amplifier is reduced by degeneration or negative feedback, of course, but this is counteracted by providing more than the required gain initially. The use of negative feedback in my filter insures that the regeneration or positive feedback shall be automatically controlled and that oscillation, the excess of positive feedback, shall not occur.

It will also be noted that the potentiometer 60 is connected across the resonant circuit 4. This potentiometer is in the megohm range and is not intended to lower the Q of the resonant circuit. It is used to adjust the peak height to any desired value independent of the average signal level, which latter is determined by resistor 7. The sum of the signal-level voltage across resistor 7 and the resonant, or frequency-selective, voltage derived from potentiometer 60 is fed to the grid of peak triode 10.

Resistor 61 is the cathode resistor of cathode-follower triode 10. The cathode thereof is connected to contact P of switch 11, and when the switches are in the peak (P) position, the signal output with the amplitude peak at the selected frequency appears at output terminal 62. Signal-ground terminal 63 carries through conductively from terminal 22 and all the conductors connecting therewith have been represented by heavy lines to distinguish from the "high" signal leads.

I now turn to examine the circuit when all the switches have been turned to the notch (N) position. At switch 1 the signal now passes via shielded lead 27 over megohm-range fixed resistor 65, coupling capacitor 66 and grid return resistor 67 to the control grid of notch pentode 13. This tube acts largely as an amplifier stage, the plate load resistor 68 has a value in the hundred-thousand ohm range. Cathode resistor 69 has a value of a few thousand ohms and cathode resistor 70 a value greater than this. Resistors 71 and 72 constitute a purely resistive screen-grid voltage divider, as before.

The plate of pentode 13 is direct coupled to the grid of cathode-follower notch triode 14. This is to avoid phase-shift in the sub-audio range. Triode 14 has cathode resistor 73. The signal output from the cathode of this tube passes through isolating capacitor 74 to switch 15. All switches now being in the N position, the signal passes via shielded conductor 26 to the grid of peak pentode 3. The signal thereupon passes through all the stages in the lower part of the diagram as for the peak function previously described. The output therefrom passes through a permanent connection at the P contact of switch 11 to the N contact of switch 16, and for that switch in the N position the output is conveyed to the cathode of notch pentode 13 via resistors 70 and 69. It is thus seen that the whole lower part of the diagram is inserted in the feedback path between the cathode of notch triode 14 and the cathode of notch pentode 13. The lower part of the diagram having a 180° signal phase shift, the feedback is negative and will therefore reduce the gain of notch pentode 13. The lower part of the diagram produces a signal peak at the selected frequency, thus the gain of the notch pentode will decrease very considerably at that frequency. Hence, a signal notch is produced in the overall filter. The output for the notch function is taken from the cathode of triode 14 through isolating capacitor 75 and shielded conductor 76 to the N contact of switch 11, passing thence, for the N position of the switch, to output terminal 62.

At switch 15 there is shown resistor 77 connected to all contacts. This has a value of several megohms and is for the purpose of avoiding switching surges when that switch is moved from one contact to another. The resistor causes all contacts to be at substantially the same potential and this keeps capacitor 74 charged to a constant D.C. potential. This means may be employed at other switches as necessary and desirable but has been shown only at the one switch in Fig. 3 for simplicity of presentation. In vibration equipment this arrangement prevents serious surges, which may represent 50 kilowatts of power at the output amplifier.

My filter is normally used in the following manner. By other means, such as a sweep oscillator and a cathode-ray oscilloscope, the operator determines that he requires either a peak or a notch at a particular frequency. Of course, in some applications this may be known from external circuit values or conditions, or the operator may search for the desired compensation by carefully manipulating the controls of the filter.

Assuming for example that a peak is required, all switches are turned to the P position. The Q′ control (57) is set for zero, i.e., to the lowest resistance value with respect to signal ground, the Q control (54) to a nominal or half-way value and the switch 49 is set to utilize the inductor giving the frequency of resonance near where the peak is required. The height control H (60) is similarly set at a low value.

The H and Q controls are now advanced to sufficiently greater values so that the frequency of the peak can be noted in relation to that required while still not forming an implitude vs. frequency characteristic having an excessive value for the system in use. The exact frequency for the peak is then obtained by adjusting capacitor switches 45 and 41 and fine tuning capacitor 53. By suitably adjusting the H, Q, and then Q′ resistor controls a peak of the required amplitude and narrowness or broadness of base as a function of frequency is obtained. For high peaks, obtaining the full response of the resonant circuit per se by maximum advancement of the H and the Q controls before further increasing the peak height by positive feedback is considered normal operating procedure.

Figure 2:
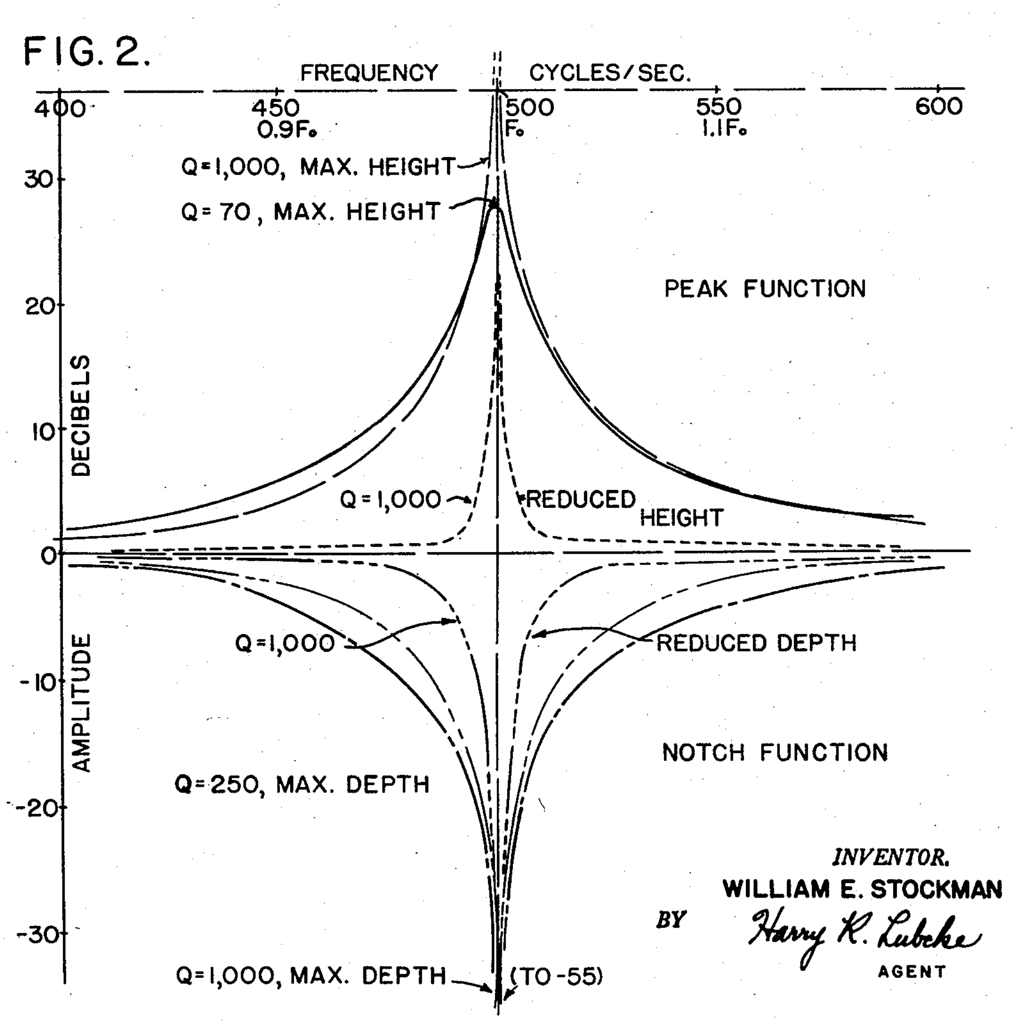
Fig. 2 is a family of response curves illustrating the performance of the filter.

Certain examples of operation are shown in Fig. 2. The $Q=70$ curve in the upper portion of the figure represents a low value of Q and the maximum height normally obtainable with a Q value of this magnitude, i.e., 28 db. By reducing the setting of the height control H to zero this curve "wilts" down to the zero axis, identified by the horizontal dashed line. The maximum peak obtainable with the filter is shown as the $Q=1{,}000$, Max. Height curve which goes beyond the graph at the top in amplitude, this being a dashed curve in Fig. 2. Should the H control be reduced to a low value, the curve obtained is that shown dotted and labelled $Q=1{,}000$, Reduced Height. Note that this curve is sharp and has narrow "skirts."

When a notch is required the switches are placed in the N positions and the procedure given above repeated. Variously shaped notches of different depths are illustrated in the lower portion of Fig. 2. The figure is for a resonant frequency of 500 cycles per second. The frequency scale is shown at the top. Any of the curves may be moved higher or lower in frequency by appropriate changes in the values of capacitance and/or inductance placed in circuit to form the parallel resonant circuit 4.

Since the inductive reactance of such a resonant circuit increases with frequency, suitable adjustment of the Q′ control as well as the Q control insures that substantially all desired values of Q can be reached at all frequencies. In practice I find it possible to increase the value of Q inherent in the elements of the parallel circuit by a factor of ten. At some frequencies, with careful adjustments, this factor may be as large as twenty. Q's of 2,000 are regularly obtained at audio frequencies. By careful design this may be exceeded.

In the matter of alternate constructions, in Fig. 3 it will be understood that more or fewer capacitors per bank may be employed and the same is true with respect to the inductors. With the capacitors arranged in decades a wide frequency range can easily be covered. For higher frequencies than audio the inductors may not have ferrous cores. Potentiometer 28 may be eliminated for simplicity, in which case capacitor 29 is connected only to contact P of switch 1 through conductor 25. Particularly as to the resistors, others may be made fixed for specific applications, whereas a number may be made variable where great flexibility of performance is desired, for instance, vacuum tube cathode, plate and screen resistors. As a matter of common practice I have used 6SJ7 vacuum tubes for the pentodes and 6SN7GT tubes for the triodes, but any pentodes and triodes may be used to suit the power level and frequency spectrum involved. Also, triodes may be used in place of the pentodes and even pentodes in the place of the triodes should there be any particular reason for such modifications.

My filter is normally embodied as a unity-gain device; that is, save for the amplitude of the peak or the notch inserted in the characteristic, the amplitude of the output signal is the same as that of the input signal, and this is the order of one volt. However, a voltage and/or power gain or loss may be accomplished by altering the amplification of the vacuum tube stages and by setting the controls such as potentiometer 28.

Another alternate more vitally concerned with the functioning of the filter consists in setting the Q′ control 57 at the top or cathode end of its range or in connecting conductor 9 directly to the cathode of feedback triode 8 and making resistor 32 variable. The latter resistor determines the degree of negative feedback in tube 3 and when made variable constitutes indirectly the Q′ control. With the Q′ control as shown in Fig. 3, the amplitude of the signal voltage fed back over conductor 9 is altered, with the alternate Q′ control this is fixed at a relatively large value but the positive-feedback loop gain is changed by adjustment of the resistance value of resistor 32. This insures maximum possible degree of stabilizing negative feedback in pentode 3.

In Fig. 3 the plate battery 33 may be replaced by the usual plate-voltage power supply, preferably well regulated and having a voltage output of the order of 200 volts. The heaters for the vacuum tube cathodes have not been shown. These are conventional. The heaters are preferably energized by saturation-stabilized step-down transformer or transformers, which are positioned in the apparatus sufficiently far enough from inductors 46, 47 and 48 so that power frequency hum will not be induced therein. These aspects are of importance when particularly high Q's are to be attained in either peak or notch functioning.

Various other changes in structural and circuit details, operating ratios and performance characteristics may be made in my filter without departing from the scope of my invention as set forth in the following claims.

Having thus fully described my invention and the manner in which it is to be practiced, I claim:

1. A four-terminal electric signal pass filter having selectively a peak or notch characteristic comprising a first amplifier having a resonant circuit connected to the output circuit thereof and a degenerative cathode resistor, a second amplifier, the input of said second amplifier connected to said resonant circuit, a regenerative feedback resistor connected between said first and second amplifiers, the recited amplifiers and resistors coactive to provide a peak characteristic at the frequency of resonance of said resonant circuit; a third amplifier selectively connectable to the input of said filter in lieu of said first amplifier, a fourth amplifier connected to said third amplifier, means to also selectively connect said recited amplifiers and resistors in a negative feedback path between said third and fourth amplifiers, said peak characteristic of said recited amplifiers and resistors increasing said negative feedback at the frequency of said peak to provide a notch signal pass characteristic for said filter at the frequency of said peak.

2. A four-terminal wave filter having selectively a peak or a notch signal pass characteristic comprising a first amplifier, a resonant circuit connected to the output thereof, a second amplifier, the input of said second amplifier connected to said resonant circuit, stabilizing feedback means in said first and second amplifiers, resistive regenerative feedback means connected between said first and second amplifiers, said resonant circuit and said first and second amplifiers coactive to provide a peak filter characteristic; a third amplifier selectively connectable to the input of said filter in lieu of said first amplifier, a fourth amplifier directly connected to said third amplifier, means to also selectively connect said resonant circuit and said first and second amplifiers in a negative feedback path between the input of said third and the output of said fourth amplifiers, said peak characteristic of said resonant circuit and said first and second amplifiers increasing said negative feedback at the frequency of said peak to provide a notch signal pass characteristic for said filter at the frequency of said peak.

3. A four-terminal electric filter having a sharp variation of passed signal amplitude as a function of frequency at a selectable frequency and selectable as to a peak or a notch in said amplitude comprising, an input amplifier, a parallel resonant circuit connected to the output of said input amplifier, a degenerative feedback amplifier, the input thereof connected to said resonant circuit, a resistive connection from said feedback amplifier to said input amplifier to provide regenerative feedback, the recited amplifiers, resonant circuit and resistive connection coactive to produce a resonant peak in the signal amplitude having a sharpness increasing with the amount of regenerative feedback; a further amplifier selectively connectable as the input of said filter in lieu of said input amplifier, said further amplifier being connected directly to a still further amplifier, said still further amplifier selectively connectable to said input amplifier and said feedback amplifier selectively connectable to said further amplifier, the selective connections placing the peak-forming circuit in a negative feedback path of said further and said still further amplifiers to increase the gain in said negative-feedback path at a selectable frequency, said peak-forming circuit thus decreasing the amplification of said further and said still further amplifiers at said frequency to form a notch in the signal amplitude as a function of frequency at said selectable frequency.

4. A four-terminal electric filter having a sharp variation of passed signal amplitude as a function of frequency at a selectable frequency and selectable as to a peak or a notch in said amplitude comprising an input gain-stabilized amplifier, an inductor and a capacitor connected to the output circuit of said input amplifier to form a shunt resonant circuit, a feedback amplifier having negative feedback means, said feedback amplifier input connected to said shunt resonant circuit, a resistive connection from said feedback means to said input amplifier to provide positive feedback, the recited amplifiers, resonant circuit and resistive connection coactive to produce a resonant peak in signal amplitude having a sharpness increasing with the degree of positive feedback; a gain-stabilized notch amplifier selectively connectable as the input of said filter in lieu of said input amplifier, said notch amplifier being direct-connected to a second gain-stabilized notch amplifier, said second notch amplifier also selectively connectable to said input amplifier and said feedback amplifier selectively connectable to said notch amplifier, the selective connections placing the peak-forming circuit in a negative-feedback path of the notch amplifiers to increase the gain of said negative-feedback path at said selectable frequency, said peak-forming circuit thus decreasing the amplification of said notch amplifiers at said selectable frequency to form a notch in the signal amplitude at said selectable frequency.

5. A four-terminal electrical wave filter having a sharp variation of passed signal amplitude as a function of frequency at a selectable frequency selectable as to an increase or a decrease in said amplitude comprising an input gain-stabilized substantially constant-current amplifier, an inductor and a capacitor connected to the output of said constant-current amplifier to form a parallel resonant circuit, a feedback amplifier having negative feedback means, the input of said feedback amplifier connected to said parallel resonant circuit, a resistive connection from said feedback means to said constant-current amplifier adapted to provide positive feedback, the recited circuit elements coacting to produce an increase in signal amplitude having a sharpness of resonance increasing with the degree of positive feedback; a gain-stabilized notch amplifier selectively connectable as the input of said filter in lieu of said constant-current amplifier, said notch amplifier being direct-connected to a second gain-stabilized notch amplifier, said second notch amplifier selectively connectable to said constant-current amplifier and said feedback amplifier selectively connectable to said notch amplifier, the selective connections placing the peak-characteristic circuit in a negative-feedback path between said notch amplifiers to increase the gain in said negative-feedback path at said selectable frequency, thus decreasing the amplification of said notch amplifiers at said selectable frequency to form a decrease in the signal amplitude.

6. A four-terminal electric filter with a transmission characteristic having a sharp variation of passed signal amplitude as a function of frequency at a selectable frequency and selectable as to a peak or a notch in said amplitude, comprising, an input gain-stabilized constant-current source, a plurality of inductors and capacitors selectively connectable to the output of said constant-current source to form a parallel-resonant circuit, a resistor connected between said resonant circuit and signal ground to form a fixed nominal signal level, a feedback amplifier having an input circuit connected to said parallel resonant circuit and having an unbypassed cathode resistor including a potentiometer, a positive-feedback connection including a resistor from said potentiometer to said constant-current source, the recited said source, resonant circuit, resistors, amplifier, potentiometer and positive-feedback connection coactive to produce a peak in said signal amplitude having a sharpness of resonance depending upon the positive feedback obtained by said positive-feedback connection, said sharpness of resonance being adjustable by adjusting said potentiometer, a peak amplifier having an input circuit connected to a second potentiometer connected across said parallel-resonant circuit exclusive of said resistor, said peak amplifier constituted to give an output to determine the amplitude of said peak, according to the adjustment of said second potentiometer, surmounting said fixed nominal signal level; a gain-stabilized notch amplifier selectively connectable to the input terminals of said filter in lieu of said constant-current source, said notch amplifier being direct-connected to a second notch stabilized amplifier selectively connectable to the input circuit of said constant-current source, the signal output circuit of said peak amplifier selectively connectable to said notch amplifier, the latter selected connection placing the peak-characteristic circuit in the negative feedback path of the notch amplifiers to increase the negative feedback at said selectable frequency and thus to decrease the amplification at said selectable frequency to form a notch in the amplitude as a function of frequency at said selectable frequency.

7. An active four-terminal electric filter having a transmission characteristic with a sharp variation of passed signal amplitude as a function of frequency at a selectable frequency and selectable as to a peak or a notch in said amplitude variation comprising, an input peak amplifier stage to act as a constant-current source having an unbypassed cathode resistor for stabilizing gain, a plurality of inductors and capacitors selectively connectable to the plate circuit of said peak amplifier to form a parallel-resonant circuit, a resistor connected between said resonant circuit and signal ground to form a fixed nominal signal level, a feedback peak cathode-follower stage having an input circuit connected to said parallel resonant circuit and having an unbypassed cathode resistor including a potentiometer, a positive-feedback connection from the variable arm of said potentiometer through a resistor to the unbypassed cathode resistor of said peak amplifier, said input stage, said parallel-resonant circuit, said resistors, said cathode-follower and said potentiometer coactive to produce a peak in said amplitude having a sharpness of resonance depending upon the degree of positive feedback obtained by said positive-feedback connection, said sharpness of resonance being adjustable by the position of the variable arm of said potentiometer, a second peak cathode-follower stage having an input circuit connected to the variable arm of a second potentiometer connected across said parallel-resonant circuit exclusive of said fixed resistor, the output of said second peak cathode-follower determining the amplitude of said peak surmounting said fixed nominal signal level according to the position of the variable arm of said second potentiometer; a notch amplifier stage selectively connectable to the input terminals of said filter in lieu of said peak amplifier stage, said notch amplifier stage having an unbypassed cathode resistor for gain stabilization, a notch cathode-follower stage having an unbypassed cathode resistor and being direct-connected to said notch amplifier stage and selectively connectable to the input circuit of said peak amplifier stage, the signal output circuit of said second peak cathode-follower stage selectively connectable through a resistor to said unbypassed cathode resistor of said notch amplifier stage, the selective connections placing the peak-characteristic circuit in the negative feedback path of the notch-amplifier stages to increase the negative feedback at said selectable frequency and thus to decrease the amplification thereat to form a notch in the amplitude characteristic at said selectable frequency.

8. An active four-terminal electrical filter having a transmission characteristic with a sharp peak variation of passed signal amplitude as a function of frequency at a selectable frequency comprising, a peak pentode-amplifier stage to act as a constant-current source having an unbypassed cathode resistor for stabilization of gain, a plurality of inductors and capacitors selectively connectable to the plate circuit of said pentode-amplifier to form a parallel resonant circuit, a fixed resistor connected between said resonant circuit and signal ground to form a fixed nominal signal level, a feedback peak triode cathode-follower amplifier stage having an input circuit connected to said parallel resonant circuit and having an unbypassed cathode resistor including a potentiometer, a positive-feedback connection including a resistor from said potentiometer through a resistor to the unbypassed cathode resistor of said pentode-amplifier, the recited amplifier stages, resonant circuit, resistors and positive feedback connection coactive to produce a peak in said amplitude having a sharpness of resonance depending upon the positive feedback obtained by said positive-feedback connection, said sharpness of resonance being adjustable by adjusting said potentiometer, a second peak triode cathode-follower stage having an input circuit connected to a second potentiometer connected across said parallel-resonant circuit exclusive of said fixed resistor, said second peak triode cathode-follower providing an output setting the amplitude of said peak surmounting said fixed nominal signal level according to the adjustment of said second potentiometer.

9. A four-terminal electric filter having a notch signal pass characteristic comprising a first amplifier having a resonant circuit connected to the output thereof, a second amplifier, the input circuit of said second amplifier connected to said resonant circuit, stabilizing feedback means in said first and second amplifiers, resistive regenerative feedback means connected between said first and second amplifiers, said resonant circuit and said first and second amplifiers adapted to provide a peak characteristic; a third amplifier connected to the input of said filter, a fourth amplifier connected in cascade to said third amplifier, means to connect said resonant circuit and said first and second amplifiers in a negative feedback path between the input of said third and the output of said fourth amplifiers, said peak characteristic thereof increasing said negative feedback at said peak to provide a notch signal pass characteristic at the frequency of said peak.

10. A four-terminal electric filter having a sharp variation of passed signal amplitude as a function of frequency at a given frequency comprising a gain-stabilized amplifier, an inductor and a capacitor connected to the output of said gain-stabilized amplifier to form a resonant lead, a feedback amplifier, the input of said feedback amplifier connected to said resonant circuit, a resistive connection from said feedback amplifier to said gain-stabilized amplifier to provide positive feedback, the recited amplifiers, inductor, capacitor and resistive connection coactive to produce a peak in signal amplitude having a sharpness of resonance increasing with the degree of positive feedback; an other amplifier connected to the input of said filter, said other amplifier being direct-connected to a second other amplifier, said second other amplifier also connected to said gain-stabilized amplifier to place the peak-forming circuit in a negative-feedback path of the other amplifiers to increase the gain in said path at said given frequency, said peak-forming circuit thus decreasing the amplification of said other amplifiers at said frequency to form a notch in the signal amplitude as a function of frequency at said given frequency.

11. An active four-terminal electrical filter having a transmission characteristic with a sharp notch variation of passed signal amplitude as a function of frequency at a selectable frequency comprising, a peak amplifier stage to act as a constant-current source having an unbypassed cathode resistor for stabilization of gain, a plurality of inductors and capacitors selectively connectable to the plate circuit of said peak amplifier to form a parallel-resonant circuit, a resistor connected between said resonant circuit and signal ground to form a fixed nominal signal level, a feedback peak cathode-follower stage having an input circuit connected to said parallel resonant circuit and having an unbypassed cathode resistor including a potentiometer, a positive-feedback connection including a resistor from said potentiometer to the unbypassed cathode resistor of said peak amplifier, the recited amplifier stages, resonant circuit, resistors, potentiometer and positive-feedback connection coactive to produce a peak in amplitude having a sharpness depending upon the positive feedback obtained by said positive-feedback connection, said sharpness being adjustable by adjusting said potentiometer, a second peak cathode-follower stage having an input circuit connected to said parallel-resonant circuit, the output of said second peak cathode-follower determining the amplitude of said peak surmounting said fixed nominal signal level; a notch amplifier stage connected to the input terminals of said filter, said notch amplifier stage having an unbypassed cathode resistor for gain stabilization and being direct-connected to a second notch amplifier stage having an unbypassed cathode resistor, said second notch amplifier stage connected to the input circuit of said peak amplifier stage, the signal output of said second peak cathode-follower stage connected to said unbypassed cathode resistor of said notch amplifier stage, the latter connection placing the recited peak-characteristic circuit in the negative feedback path of the notch-amplifier stages to increase the negative feedback at said selectable frequency and thus to decrease the amplification at said selectable frequency to form a notch in the amplitude as a function of frequency characteristic at said selectable frequency.

References Cited in the file of this patent

UNITED STATES PATENTS

| | | |
|---|---|---|
| 2,068,112 | Rust | Jan. 19, 1937 |
| 2,243,401 | Sturley | May 27, 1941 |
| 2,268,672 | Plebanski | Jan. 6, 1942 |
| 2,344,618 | Koch | Mar. 21, 1944 |
| 2,359,504 | Baldwin | Oct. 3, 1944 |
| 2,672,529 | Villard | Mar. 16, 1954 |
| 2,774,043 | Villard | Dec. 11, 1956 |